Nov. 29, 1955  R. B. WAY ET AL  2,725,035
SUPPORTING FIXTURE FOR PAINTING
Filed April 1, 1953  2 Sheets-Sheet 1
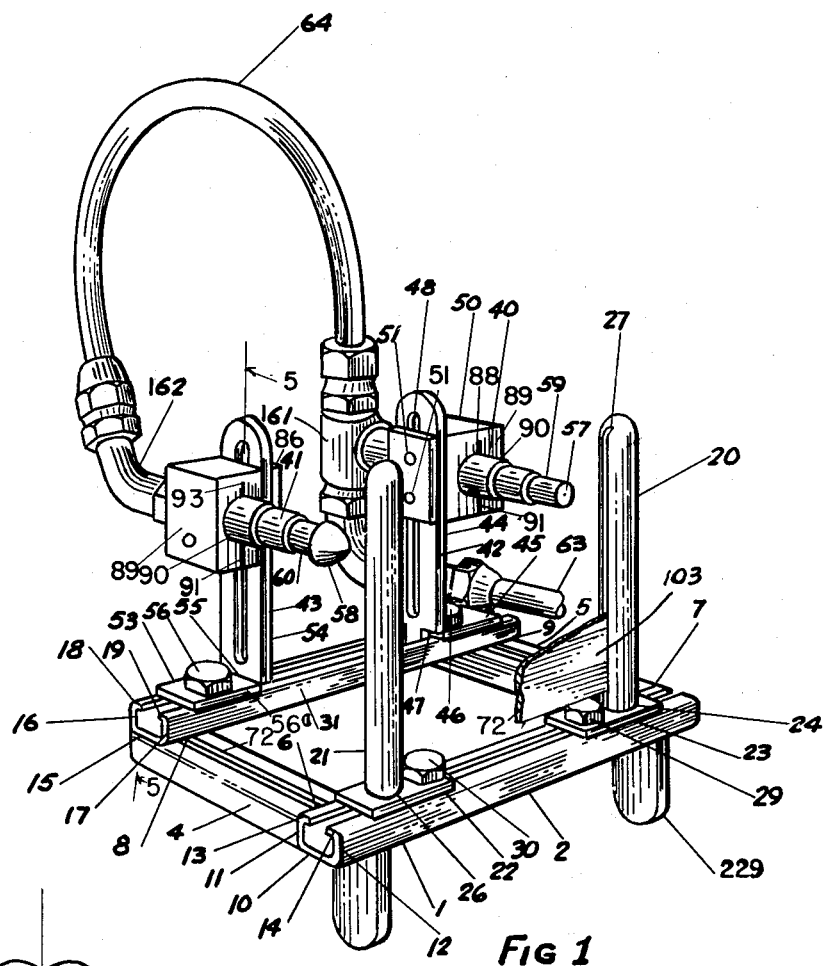
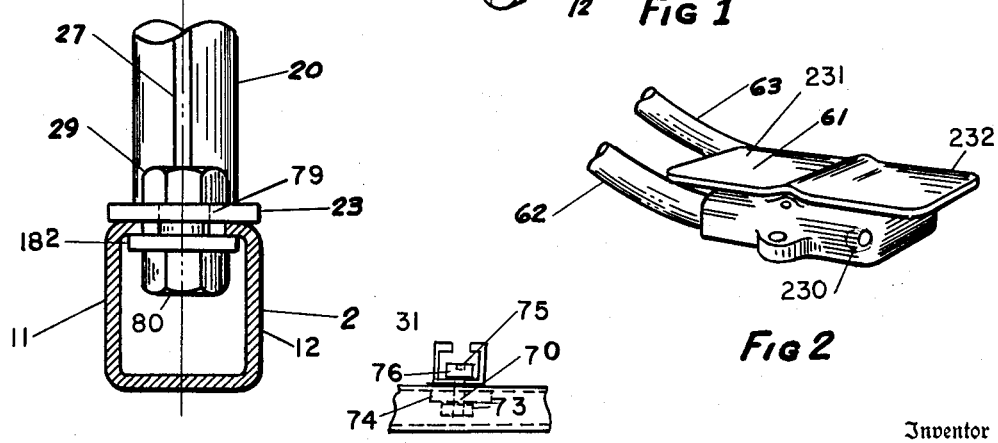
Inventor
ROBERT B. WAY
By CARL HERSEY
Charles L. Lovercheck Attorney

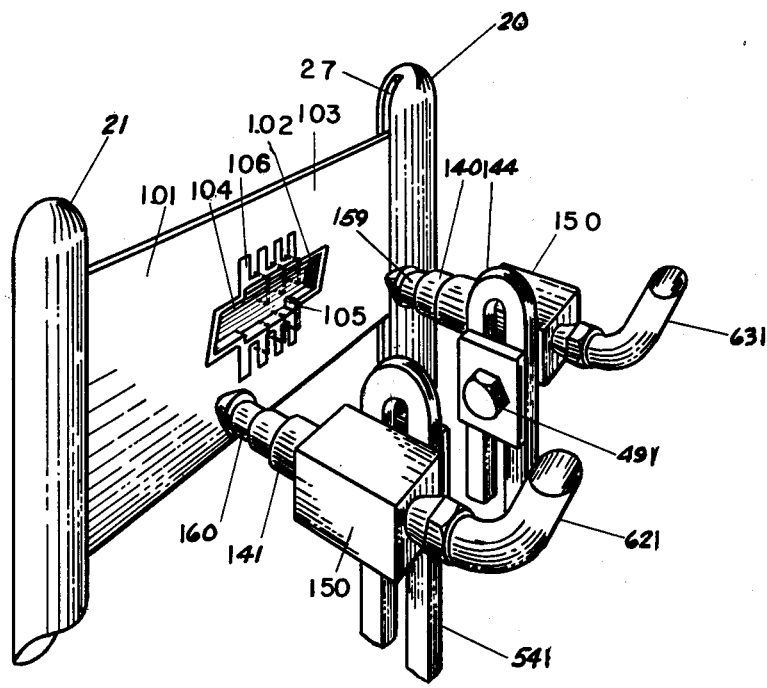
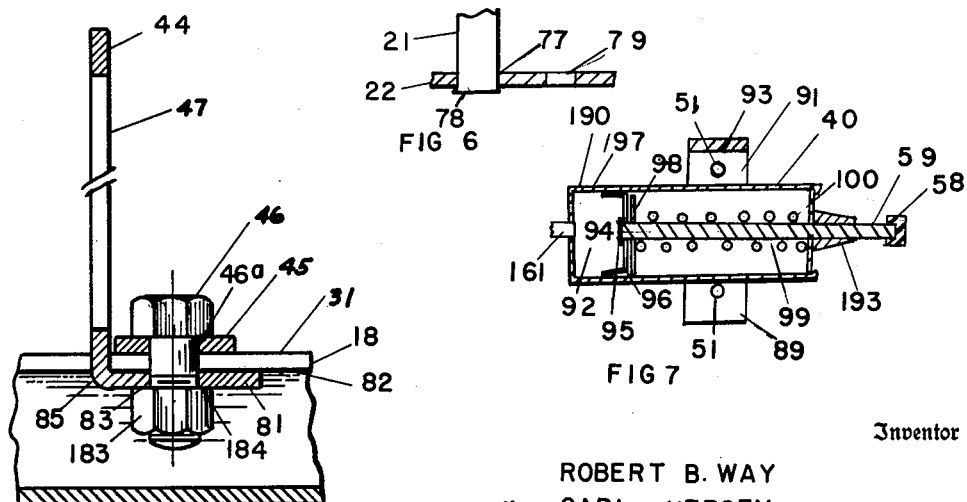

United States Patent Office 2,725,035
Patented Nov. 29, 1955

2,725,035

SUPPORTING FIXTURE FOR PAINTING

Robert B. Way and Carl Hersey, Erie, Pa.

Application April 1, 1953, Serial No. 346,125

11 Claims. (Cl. 118—503)

This invention relates to fixtures and more particularly to fixtures for supporting articles of manufacture while they are being painted or during other processes.

In fixtures for supporting articles of manufacture while they were being painted or during other processes, which were made according to previous designs and with which we are familiar, the fixture for supporting the work was designed and built for the particular job upon which it was to be used for a particular size of article and after the job was completed and a new lot of articles of a different size were to be supported, it was necessary to discard the fixture and build another fixture of the correct size for supporting the particular size of articles. Designing new fixtures for each job requires the work of a designer to design a fixture and the work of skilled mechanics to build it and the fixture had to be either discarded or stored until another lot of articles of the exact size for which the fixture was built were to be processed. Either discarding the fixtures or storing them was an expensive procedure. In many prior designs, it was necessary for the operator to hold the article to be painted or processed in place in the fixture with his hand. In painting, the operator was inclined to let the article being painted move in the mask and this resulted in an imperfect paint job.

It is, accordingly, an object of our invention to overcome the above and other defects in prior work supporting fixtures and it is more particularly an object of our invention to provide a fixture for supporting articles of manufacture during the painting or other processes which will be simple to construct, economical to manufacture, and practical, efficient and positive in operation.

Another object of our invention is to provide a fixture for supporting articles of manufacture during painting or other processes which will support a paint mask wherein articles to be painted will be positively held in place by a plurality of air actuated cylinders during painting or other processes.

A further object of the invention is to provide a fixture for supporting articles of manufacture during processing wherein the various parts of the article of manufacture can be held in place in the fixture at a plurality of different parts of the article.

Another object of our invention is to provide a work supporting fixture wherein the work is held in place by air cylinders which are adjustable toward or away from the work to accommodate curved work such as a refrigerator door.

Another object of the invention is to provide a work supporting fixture that is adjustable to support a wide range of sizes of articles of manufacture during painting or other processes.

Another object of the invention is to provide a fixture for supporting articles of manufacture during painting or other processes wherein the fixture is adjustable to accommodate a wide range of sizes of work supporting paint masks and wherein air cylinder clamping means can be located so as to engage the article of manufacture at a wide range of vertical and horizontal points.

A further object of the invention is to provide a fixture for supporting articles of manufacture wherein the article to be painted is held in place in the fixture by means of air or fluid actuated cylinders.

With the above and other objects in view, the present invention consists of the combination and arrangement of parts hereinafter more fully described, illustrated in the accompanying drawings, and more particularly pointed out in the appended claims, it being understood that changes may be made in the form, size, proportions, and minor details of construction without departing from the spirit or sacrificing any of the advantages of the invention.

In the drawings:

Fig. 1 is a perspective view of a novel paint fixture according to our invention;

Fig. 2 is a view of the foot control for the air clamping cylinders used on our novel fixture;

Fig. 3 is a detailed view of a part of the invention;

Fig. 4 is a partial view of the fixture with a paint mask in place;

Fig. 5 is a longitudinal cross sectional view taken on line 5—5 of Fig. 1;

Fig. 6 is a cross sectional detail view of a part of the fixture shown in Fig. 1;

Fig. 7 is a cross sectional view of an air cylinder used in combination with the invention; and Fig. 8 is a detailed end view of part of our invention.

Referring now to the drawings in detail, we show our novel paint fixture having a support frame 1 made up of front and rear members 2 and 31, respectively, and end members 4 and 5, respectively. The end members 4 and 5 are preferably welded to the front member 2 at 6 and 7, respectively, and the rear member 31 is preferably supported on the end members 4 and 5 at 8 and 9, respectively, by means of bolts 70 which extend through the rear channel member 31 and further extend through the slots 72 in the channel shaped end members 4 and 5. A nut 73 threadably engages the bolts 70 and a square plate 74 is preferably attached by welding to nut 73 to keep the nut 73 from rotating in the channels 4 and 5 when the bolt 70 is rotated by inserting a suitable wrench in the socket 75 of the head 76 of the bolt 70 to loosen the bolts 70 and, thereby, allow the rear member 31 to slide forward or rearward over the end members 4 and 5 to bring the air cylinders 40 and 41 nearer or further from the mask supports 20 and 21. This adjustment can be made in order to get optimum movement of tips 58 as they engage and disengage the articles which are to be supported in the mask.

The front member 2 is channel shaped in cross section having the web 10, the flanges 11 and 12, and the top part of the flanges bent toward each other to form ends 13 and 14. The rear member 31 is likewise channel shaped in cross section having the web member 15 and the flanged members 16 and 17 with their upper ends bent toward each other to form ends 18 and 19.

The masks or work supports 20 and 21 are supported on the front member 2 by means of the bases or plates 22 and 23. The mask supports 20 and 21 are preferably made of solid cylindrical rod material but they could be made of hollow tubular material. The member 20 is preferably inserted through the hole 77 and the end 78 peened, pressed, brazed, or welded to hold the support in place and the end 78 extends into the slot between ends 13 and 14 to align plates 22 and 23. The mask support members 20 and 21 have vertical mask receiving slots 27 formed therein. The mask supporting members 20 and 21 are mounted on the plates 22 and 23 and are held in adjusted position on the front member 2 by means of the bolts 29 and 30. The bolts 29 and 30 extend through holes 79 in the plates 22 and 23 and have nuts 80 threadably engaging the bolts and disposed between the flanges 11 and 12 and the web 10 of the channel member 2. The nuts 80 may be welded or brazed to square washers 182 to prevent the nuts from rotating when the bolts 29 and 30 are turned in tightening and loosening the nuts. In order to adjust the mask supporting members 20 and 21 on the channel member 2, it is merely necessary to loosen the bolts 29 and 30 on the nuts 80 with an ordinary wrench and slide the mask supporting members 20 and 21 to their desired spaced location and then tighten the bolt 29 on the nuts 80. The air cylinders 40 and 41 are supported on the supporting angles 42 and 43, respectively. The supporting member 42 has the vertical member 44 and a horizontal member 81 which engages the inner surface 82 of the ends 18 and 19 of the channel member 31. Bolt 46 extends through a hole 83 in the horizontal member 81 and nut 183 is preferably welded to member 81 at 184 to prevent the nut from rotating. The members 44 and 81 are bent at right angles to each other at 85. The member 44 is notched to provide reduced width portion 47 which passes through the groove between ends 18 and 19 of channel 31. The bolt 46 extends through a hole 46a in square washer 45 and square washer 45 rests on top of ends 18 and 19. A vertical slot 48 is provided in the vertical member 44 and bolts 51 extend through block 89 and the slot 48.

A bore 88 is formed in each block 89 and air cylinders 40 and 41 are disposed in bores 88 and engaged by blocks 89 at 90. The blocks 89 have longitudinal slots 91 which terminate at 93 whereby air cylinders may be clamped in place. Heads of the bolts 51 are countersunk into blocks 89 and threadably engage plates 86. The bolts 51 perform the dual function of clamping blocks 50 on members 42 and 43 and in clamping cylinders 40 and 41 in bores 88.

The support 43 has a horizontal member similar to member 81 disposed at right angles to the vertical member 54 and bent thereto at 55. The headed bolt 56 extends through the square washer 56a into the groove between the ends 18 and 19 to lock the support 43 in the desired lateral spaced position relative to support 42. The cylinders 40 and 41 are preferably designed as shown in Fig. 7 and have tips 58 attached to the respective ends 57 of the plunger or piston rods 59 and 60. The cylinders are supplied with air through hoses 63 and 64 through the foot control valve means 61 which controls the flow of air from an air hose 62 which is connected to a source of compressed air or fluid and through the hose 63 into the T-branch 161. Air or fluid through the hose 63 flows through the T-branch 161 and to the hose 64 to the coupling 162 and into the cylinder 41 to operate the cylinder by causing the piston rod 60 to force the tip 58 into engagement with the part to be painted to hold it firmly in the mask. The tip 58 is made of resilient material or rubber and prevents the piston rod from scratching or marring the article.

The air cylinder 41 is the same as the air cylinder shown in detail in Fig. 7. A casing 190 is in the form of a closed cylinder having T-branch 161 communicating with the space 92 in one end thereof. The piston rod 59 extends through the guide member 193 and terminates at the peened end 94 which holds the washer 95 in contact with the leather plunger 96 and plunger 96 slidably engages the inside walls of the cylinder. The large washer 97 is secured to the piston rod 59 at 98 and the piston is urged toward the end containing the T-branch 161 by the spring 99 which engages the washer 97 and the end 100.

During operation, a mask such as 101 will be inserted between the supports 20 and 21 with its ends engaging the slots 27. The bolts 29 and 30 will be loosened and the supports 20 and 21 pushed together until they fit tightly against the ends of mask 101. Then the bolts 70 will be loosened and the rear member 31 moved forward until the cylinders 40 and 41 are at the desired distance from the mask 101 so that the piston rods 59 and 60 will have the desired amount of travel to carry the rubber tips 58 into engagement with the work which is to be supported in the recess 102 in the mask. The mask is made up of the supporting sheet 103 with the masking portion 104 supported on the sheet 103 by the reinforcing bridging members 105. A sample of work to be painted is manually loaded behind the mask in the proper relative location to masking portion 104. The pedal of the valve control 61 is operated to admit air or fluid into the cylinders 40 and 41. This will drive the piston rods 159 and 160 which are very similar to the piston rods 59 and 60 in Fig. 1 into contact with the article to be painted. A damping means is preferably used with cylinders 40 and 41 to limit the velocity of the piston rods 59 and 60 to prevent the tips 58 from striking the article too hard and, thereby, avoid damage to the masks and the article. This is accomplished by using a three way valve controlled by the pedal in valve control 61. When the end 231 is pressed, air or fluid flows from hose 62 to hose 63. When end 232 is pressed, air from hose 62 is stopped and air flows from hose 63 out hole 230. The air cylinders will hold the article to be painted firmly in position against the mask while the operator sprays, rolls, or brushes paint from the side of the mask opposite the cylinders. Paint will be admitted through the openings 106 and, thereby, coat or paint a portion of the article corresponding in shape to the slots 106. When the painting operation is done, the operator will release the valve 61 which will cause the return spring 99 to drive the piston back to the neutral position, expelling air or fluid out of hole 230 and pulling the tips 58 out of engagement with the work so that the work can be removed or unloaded from the mask and another article inserted therein for painting.

The air clamping cylinders 140 and 141 are similar in operation to the cylinders 40 and 41 shown in Fig. 1; however, the cylinders 140 and 141 are not slidable in blocks 150 and air is admitted through hoses 621 and 631 and the blocks 150 are held in place on supports 144 and 541 by means of bolts 491.

It is obvious that this fixture has more general utility in other manufacturing and similar operations than for use in painting. Because of the particular design of our fixture, we are able to add air clamping cylinders and supports on member 31 in addition to those supported on supports 42 and 43 in order to support larger articles in a mask and to provide support at a large number of points. Some of the cylinders could be supported above others and the length of the fixture could be increased to provide space for a mask to support a very large article.

In the foregoing specification, we have set forth the invention in its preferred practical forms but we are aware that the structure shown is capable of modification within a range of equivalents without departing from the invention which is to be understood is broadly novel as is commensurate with the appended claims.

What we claim is:

1. A fixture for supporting paint masks comprising two spaced supporting members, each having a longitudinal slot in the side thereof facing the other support, said slots in said supporting members adapted to receive a supporting sheet, means to support said sheet in said slots, said supports being adjustable toward and away from each other whereby said supporting members are adapted to support varying sizes of sheets, and clamping means spaced from said supporting members to clamp articles to a clamping sheet having its edges adapted to be supported in said slots in said supporting members.

2. A fixture for supporting paint masks comprising two spaced supporting members, each having a longitudinal slot in the side thereof facing the other support, said slots in said supporting members adapted to receive a supporting sheet, means to support said sheet in said slots, said supports being adjustable toward and away from each other whereby said supporting members are adapted to support varying sizes of sheets, and clamping means spaced from said supporting members, said clamping means comprising a fluid actuated cylinder having piston rods adapted to move toward said supporting sheet supported between said supporting members whereby an article of manufacture may be held in place in clamped portion in a paint mask adapted to be disposed on said supporting sheet between said support members.

3. A fixture for supporting paint masks comprising two spaced supporting members, each having a longitudinal slot in the side thereof facing the other support, said slots in said supporting members adapted to receive a supporting sheet, means to support said sheet in said slots, said supports being adjustable toward and away from each other whereby said supporting members are adapted to support varying sizes of sheets, and clamping means spaced from said supporting members, said clamping means comprising fluid actuated cylinders having a part thereof movable toward a sheet supported in said slots in said support members when air is admitted to said cylinders.

4. A fixture for supporting paint masks comprising two spaced supporting members on said fixture, each said supporting member having a longitudinal slot in the side thereof facing the other support, said supports being adjustable toward and away from each other, and clamping means spaced from said supporting members, said clamping means comprising fluid actuated cylinders having a part thereof movable toward said support members when fluid is admitted to said cylinders, said fluid actuated cylinders being adjustable to positions relative to said support means whereby said clamping means is adapted to engage an article to clamp said article to a supporting sheet having its edges received in said slots.

5. A fixture for supporting paint masks comprising two spaced supporting members, each having a longitudinal slot in the side thereof facing the other supporting member, said supporting members being adjustable toward and away from each other, and clamping means spaced from said supporting members, means to support said clamping means, said clamping means comprising fluid actuated cylinders having a part thereof movable toward said supporting members when fluid is admitted to said cylinders, said fluid actuated cylinders being adjustable in a plane parallel to the plane of said supporting members to positions relative to said supporting members, each cylinder being adjustable with regard to said supporting members independent of other cylinders.

6. The fixture recited in claim 5 wherein said spaced supporting members are supported on a channel member and disposed longitudinally thereof, said channel member comprising a web member and two flange members extending longitudinally of said channel member, said flange members having their ends remote from said web bent toward each other to form inwardly turned ends, and fastening means engaging said ends of said flange members and said support members, said fastening means comprising a plate attached to each support means and bolts extending through said plates and engaging a washer disposed inside said channel and engaging said inwardly turned ends, and fastening means on said bolts to lock said support members in position whereby said support members can be adjustably spaced relative to each other.

7. The fixture recited in claim 6 wherein a second channel member is disposed generally parallel to said first channel member, spaced air actuated cylinders are supported on said second channel member to clamp articles to said supports, means are provided to attach said air cylinders to said second channel in adjusted spaced relation relative to each other, and means are provided to attach said second channel to said first channel in adjusted position relative to said first channel.

8. The fixture recited in claim 5 wherein said spaced supporting members are supported on two generally parallel channel shaped members having their open sides facing upward and having the ends of their flanges turned inward, means to support said channel members in spaced relation, vertically extending members being attached to said channels by means of plates resting on said channels, said supporting members being attached to said plates, means to hold said plates to said channels, said fluid actuated cylinders supported on one said channel to clamp an article of manufacture to a plate supported between said vertical members, said means to clamp said vertically extending members comprising a nut in said channel, and a bolt extending through a hole in said plate whereby said vertical members can be locked in position on said channel in any desired spaced relation to each other.

9. A fixture comprising a channel member, two spaced supporting members disposed longitudinally of said channel member and on the open side thereof, said channel member comprising a web member and two flange members extending longitudinally of said channel member, said flange members being bent toward each other to form inwardly turned end members, fastening means, said fastening means comprising a plate attached to each said supporting member and engaging said channel member adjacent said ends, bolts extending through said plates and engaging a member engaging said inturned ends to lock said support members in position whereby said supporting members can be adjustably spaced relative to each other, a second channel member disposed generally parallel to said first channel member, spaced air actuated clamping cylinders supported on said second channel member, means to attach said air cylinders to said second channel in adjusted spaced relation relative to each other, and means to attach said second channel to said first channel in adjusted spaced relation thereto, said air cylinder supporting means comprising bored blocks adjustable toward and away from said second channel, said air cylinders supported in said bores and adjustably slidable therein.

10. The fixture recited in claim 9 wherein means is provided to lock said cylinders in predetermined positions relative to said supports, said means comprising a slot cut in said block, and means is provided to force the block material on either side of said slot toward said cylinders to clamp said cylinders.

11. The fixture recited in claim 9 wherein said plates and bolts are disposed between said supporting members, said bolts having heads extending above said plates disposed between said supporting members whereby supporting sheets supported on said supporting members will rest on said bolt heads at one end thereof, limiting the movement of said sheets relative to said supporting members.

References Cited in the file of this patent

UNITED STATES PATENTS

| | | |
|---|---|---|
| 1,253,847 | Lynch | Jan. 15, 1918 |
| 1,656,624 | Finsen | Jan. 17, 1928 |
| 2,340,587 | Graham | Feb. 1, 1944 |
| 2,430,366 | Porterfield | Nov. 4, 1947 |
| 2,534,741 | Swenson | Dec. 19, 1950 |
| 2,554,433 | Warren | May 22, 1951 |
| 2,559,958 | Herts et al. | July 10, 1951 |
| 2,623,560 | Joseph | Dec. 30, 1952 |
| 2,644,194 | Fill | July 7, 1953 |